United States Patent
Cai et al.

(10) Patent No.: US 9,676,932 B2
(45) Date of Patent: Jun. 13, 2017

(54) ADSORBING VINYL ESTER BINDERS

(75) Inventors: Qiaoqiao Cai, Shanghai (CN); Junyu Chen, Shanghai (CN); Xiangting Dong, Shanghai (CN); Tingke Zhang, Shanghai (CN); James C. Bohling, Lansdale, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/418,099

(22) PCT Filed: Aug. 2, 2012

(86) PCT No.: PCT/CN2012/079540
§ 371 (c)(1),
(2), (4) Date: Jan. 29, 2015

(87) PCT Pub. No.: WO2014/019184
PCT Pub. Date: Feb. 6, 2014

(65) Prior Publication Data
US 2015/0191589 A1  Jul. 9, 2015

(51) Int. Cl.
| | |
|---|---|
| *C08L 35/02* | (2006.01) |
| *C08L 43/02* | (2006.01) |
| *C08L 33/14* | (2006.01) |
| *C08L 31/02* | (2006.01) |
| *C08L 31/04* | (2006.01) |
| *C08F 220/10* | (2006.01) |
| *C08F 230/02* | (2006.01) |
| *C09D 143/02* | (2006.01) |
| *C08K 3/22* | (2006.01) |
| *C08L 33/08* | (2006.01) |
| *C08L 33/02* | (2006.01) |

(52) U.S. Cl.
CPC ............ *C08L 33/14* (2013.01); *C08F 220/10* (2013.01); *C08F 230/02* (2013.01); *C08K 3/22* (2013.01); *C08L 31/02* (2013.01); *C08L 31/04* (2013.01); *C08L 43/02* (2013.01); *C09D 143/02* (2013.01); *C08K 2003/2241* (2013.01); *C08L 33/02* (2013.01); *C08L 33/08* (2013.01); *C08L 2201/54* (2013.01)

(58) Field of Classification Search
CPC ........ C08F 220/10; C08F 230/02; C08K 3/22; C08K 2003/2241; C08L 43/02; C08L 31/02; C08L 31/04; C08L 33/02; C08L 33/08; C08L 33/14; C09D 143/02
See application file for complete search history.

(56) References Cited

U.S. PATENT DOCUMENTS

| | | | |
|---|---|---|---|
| 3,407,159 A | 10/1968 | Fink et al. | |
| 4,812,510 A * | 3/1989 | Barnett | C08F 18/08 524/807 |
| 6,492,451 B1 * | 12/2002 | Dersch | C03C 17/009 524/430 |
| 6,610,412 B2 | 8/2003 | Ungefug | |
| 6,710,161 B2 | 3/2004 | Bardman et al. | |
| 7,179,531 B2 | 2/2007 | Brown et al. | |
| 7,649,067 B2 * | 1/2010 | Zecha | C08F 218/18 526/287 |
| 2007/0238807 A1 | 10/2007 | Safir et al. | |
| 2008/0269402 A1 * | 10/2008 | Maurice | C08F 220/14 524/547 |
| 2010/0255301 A1 | 10/2010 | Moller et al. | |

FOREIGN PATENT DOCUMENTS

JP    58113777 A    7/1983

* cited by examiner

Primary Examiner — Satya Sastri
(74) Attorney, Agent, or Firm — Reid S. Willis

(57) ABSTRACT

The present invention relates to a composition of a stable aqueous dispersion of polymer particles comprising structural units of a) vinyl acetate; b) a vinyl ester of a branched carboxylic acid monomer; and c) a phosphorus acid monomer. The composition of the present invention provides vinyl ester/phosphorus acid based polymer particles that improve hiding efficiency in pigmented coatings formulations.

5 Claims, No Drawings

ADSORBING VINYL ESTER BINDERS

BACKGROUND OF THE INVENTION

The present invention relates to copolymers of vinyl esters, which are useful as binders in paint formulations.

Vinyl acetate polymers and copolymers are widely used as binders in architectural coatings formulations. These binders are relatively inexpensive, as compared to their acrylic counterparts, yet they have proven to be difficult to prepare as copolymers with pigment-adsorbing monomers such as phosphorus acid monomers or salts thereof. U.S. Pat. No. 6,710,161 teaches a distinct preference for copolymerizing a phosphorus acid monomer and a co-monomer at a pH of less than 2, and more preferably less than 1.5. The stated belief for the preference in carrying out the copolymerization reaction at a low pH (below the first $pK_a$ of the acid monomer) is that the phosphorus acid monomer is protonated and, therefore, less water soluble than it would be at higher pH; thus, polymerization of the protonated phosphorus acid monomer is believed to lead to increased incorporation of the monomer into the growing particle particles and a reduction of undesired water-soluble phosphorus acid polymer remaining in the reaction medium. Experimental results support this theory: A paint prepared using a polyphosphoethyl methacrylate, methyl methacrylate, butyl acrylate binder prepared at pH 1.35 shows superior solvent resistance to a paint prepared using a binder made from the same monomer mix but at a pH of about 2.2.

The patent teaches, by inference, that adsorbing latexes of vinyl acetate and a phosphorus acid monomer should be exceedingly difficult to prepare: If polymerization of vinyl acetate and a phosphorus acid monomer were carried out at a pH above the first $pK_a$ of the phosphorus acid monomer (generally above 2), one would predict unacceptable levels of non-incorporated phosphorus acid oligomers or polymer in the aqueous phase; however, at low pH, vinyl acetate is known to hydrolyze.

U.S. Pat. No. 7,179,531 teaches a two-stage "acorn" copolymer comprising a crosslinked acrylic core containing structural units of phosphoethyl methacrylate, butyl acrylate, and methyl methacrylate protuberating from a (poly) vinyl acetate-butyl acrylate shell. Significantly, the core contains no structural units of vinyl acetate, which is known to hydrolyze under the low pH conditions of the first stage polymerization reaction. Therefore, no actual copolymers of phosphoethyl methacrylate and vinyl acetate were prepared in a single stage in this complex and costly 2-stage process.

It would therefore be an advance in the art of adsorbing latex polymers to find a way to make an adsorbing vinyl acetate latex-phosphorus acid polymer from concomitant polymerization of vinyl acetate and the phosphorus acid monomer without the aforementioned shortcomings.

SUMMARY OF THE INVENTION

The present invention addresses a need in the art by providing a composition comprising a stable aqueous dispersion of polymer particles comprising from 30 to 90 weight percent structural units of vinyl acetate, from 0.1 to 5 weight percent structural units of a phosphorus acid monomer or a salt thereof, and from 5 to 60 percent structural units of vinyl ester of a branched carboxylic acid monomer characterized by the following formula:

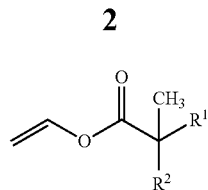

where $R^1$ and $R^2$ are each independently $C_1$-$C_{10}$-alkyl.

The composition of the present invention provides vinyl ester/phosphorus acid based polymer particles that improve hiding efficiency in pigmented coatings formulations. Moreover, paint formulations and binders that contain structural units of branched vinyl esters of carboxylic acid monomers display improved hydrophobicity as well as chemical and UV resistance.

DETAILED DESCRIPTION OF THE INVENTION

The present invention provides a composition comprising a stable aqueous dispersion of polymer particles comprising from 30 to 90 weight percent structural units of vinyl acetate, from 0.1 to 5 weight percent structural units of a phosphorus acid monomer or a salt thereof, and from 5 to 60 percent structural units of vinyl ester of a branched carboxylic acid monomer characterized by the following formula:

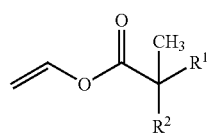

where $R^1$ and $R^2$ are each independently $C_1$-$C_{10}$-alkyl.

As used herein, the term "structural units" refers to the remnant of the recited monomer after polymerization. For example, a structural unit of vinyl acetate is as illustrated:

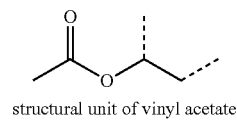

structural unit of vinyl acetate where the dotted lines represent the points of attachment of the structural unit to the polymer backbone. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates and methacrylates, including phosphoethyl methacrylate and phosphopropyl methacrylate, with phosphoethyl methacrylate being especially preferred. "Phosphoethyl methacrylate" (PEM) is used herein to refer to the following structure:

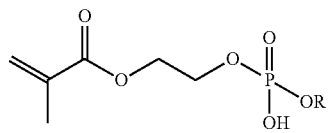

where R is H or

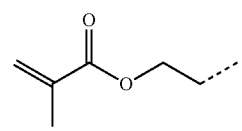

A preferred concentration of structural units of the phosphorus acid monomer, preferably PEM, is from 0.5 to 2 weight percent, based on the weight of the polymer particles.

The polymer particles preferably comprise 0.1 to 2.0 weight percent, based on the weight of the polymer particles, structural units of a sulfur acid monomer or a salt thereof. Examples of suitable sulfur acid monomers include sulfoethyl methacrylate, sulfopropyl methacrylate, vinyl sulfonic acid, 2-acrylamido-2-methyl propanesulfonic acid, and 2-methacrylamido-2-methyl propanesulfonic acid, and salts thereof. Preferred sulfur acid monomers are 2-acrylamido-2-methyl propanesulfonic acid and vinyl sulfonic acid, and salts thereof. The polymer particles more preferably comprise 0.5 to 1.5 weight percent, based on the weight of the polymer particles, structural units of a salt of 2-acrylamido-2-methyl propanesulfonic acid or a salt of vinyl sulfonic acid.

Examples of suitable vinyl esters of branched carboxylic acid monomers are the vinyl ester of neodecanoic acid (commercially available as VeoVa 10 monomer) and the vinyl ester of neononanoic acid (commercially available as VeoVa 9 monomer).

The polymer particles are preferably film-forming at ambient temperature. As such, it is preferred that the polymer particles include structural units of monomers that reduce the $T_g$ of the polymer particles, as measured differential scanning calorimetry, to less than 20° C. The polymer particles preferably comprise from 0.1 to 50 weight percent, more preferably to 20 weight percent, based on the weight percent of the polymer particles, structural units of acrylate monomers. Examples of suitable acrylate monomer include ethyl acrylate, butyl acrylate, and 2-ethylhexyl acrylate, and combinations thereof. More preferably, the polymer particles further comprise from 1 to 30, more preferably to 15 weight percent structural units of butyl acrylate, based on the weight of the polymer particles.

In another aspect the stable aqueous dispersion of polymer particles is contacted with a dispersion of pigment particles such as $TiO_2$ particles to form a dispersion of at least some of the polymer particles adsorbing to the surface of $TiO_2$ particles. As used herein, "adsorbing" refers to polymer particles contacting or attaching to the surface of the $TiO_2$ particles in a manner other than covalent bonding.

The aqueous dispersion of polymer particles can be prepared by contacting together the vinyl acetate; the vinyl ester of the branched carboxylic acid monomer; the phosphorus acid monomer or salt thereof; optionally the sulfur acid monomer or salt thereof, preferably sodium vinyl sulfonate or sodium styrene sulfonate; and optionally the alkyl acrylate, preferably butyl acrylate, under emulsion polymerization conditions. The phosphorus acid monomer may be buffered or unbuffered, though it is believed that the use of buffered phosphorus acid monomer may reduce the amount of undesirable hydrolysis byproducts of vinyl acetate.

A monomer emulsion can be made by contacting water and phosphorus acid monomer, preferably PEM, to a vessel, followed by addition of sufficient base to adjust the pH in the range of 5 to 7. Subsequently, the vinyl acetate, the vinyl ester of a branched carboxylic acid monomer, and optionally other monomers (the bulk monomers) are added to the vessel containing the buffered PEM. Surfactant, preferably anionic, nonionic, or a combination thereof, is advantageously added prior to the addition of the bulk monomers.

The aqueous dispersion of polymer particles can in one aspect be prepared by forming an at least partially neutralized solution of the phosphorus acid monomer, then contacting the solution with vinyl acetate, the vinyl ester of the branched carboxyl acid monomer, and optionally the other monomer, under emulsion polymerization conditions. As used herein, the term "at least partially neutralized phosphorus acid monomer" refers to an aqueous solution of a phosphorus acid monomer containing not less than ½ the molar amount of neutralizing agent required to neutralize the monomer, up to the amount required to completely neutralized the monomer, preferably up to the amount required to reach a pH equal to the highest $pK_a$ (preferably the second $pK_a$) of the monomer. For example, if the neutralizing agent is ammonia, and the phosphorus acid monomer is PEM, the suitable molar ratio of ammonia to PEM would be at least 1:1 and preferably up to 2:1. Suitable neutralizing agents include, for example, ammonia, KOH, NaOH, ethanol amine, and aminomethyl propanol. It is preferred that pH of the aqueous solution of the phosphorus acid monomer, prior to contact with the vinyl acetate and optionally one or more additional monomers, be in the range of from 4.5, more preferably from 5.0, most preferably from 5.5; to 8.0, more preferably to 7.5, and most preferably to 7.2. The pH of the polymerization medium is maintained at such a level to minimize the hydrolysis of the vinyl acetate monomer and of the vinyl ester of the branched carboxyl acid monomer, or of the polymer, and is preferably buffered throughout the polymerization process to maintain a pH in the range of from 4.5, more preferably from 5.5; to 8, more preferably to 7. After the polymerization is complete, the consequent stable aqueous dispersion of polymer particles may be contacted with pigment particles to form a composite. In that case, the aqueous dispersion of polymer particles is advantageously adjusted to a pH in the range of 8 to 10 before, during, or after being contacted with the pigment particles, preferably an aqueous dispersion of $TiO_2$ particles, to form the composite of polymer particles and the pigment particles.

The composition of the present invention is useful as a binder in a coatings formulation such as above critical or below critical paint formulations. The binder is advantageously mixed with pigment, preferably $TiO_2$, or a formulation containing pigment, preferably under basic conditions, to form a composite of polymer particles and pigment particles with higher pigment efficiency. The formulation containing the composite may also include any of a variety of other materials such as solvents; fillers; rheology modifiers; other binders; hollow pigments, including pigments having one or more voids; dispersants, such as aminoalcohols and polycarboxylates; surfactants; defoamers; extenders; preservatives, such as biocides, mildewcides, fungicides, algaecides, and combinations thereof; coalescents; flow agents; leveling agents; and neutralizing agents, such as hydroxides, amines, ammonia, and carbonates.

EXAMPLES

The following examples are for illustrative purposes only and are not intended to limit the scope of this invention.

ABBREVIATIONS

| Abbreviation | Chemical name or description (% s in water are indicated) |
|---|---|
| FES-32 | Disponil FES-32 emulsifier (30% aq) |
| FES-993 | Disponil FES-993 emulsifier (30% aq) |
| PEM | Phosphoethyl methacrylate (60% active) |

-continued

| Abbreviation | Chemical name or description (% s in water are indicated) |
|---|---|
| aq NH$_3$ | Ammonia (28% aq) |
| 15-S-40* | TERGITOL ™ Secondary Alcohol Ethoxylate (70% aq) |
| SVS | sodium vinyl sulfonate (25% active) |
| BA | Butyl acrylate |
| SPS | Sodium Persulfate |
| VA | Vinyl acetate |
| IAA | Isoascorbic acid |
| FF6 | Bruggolite FF6 |
| t-BHP | t-Butyl hydroperoxide |
| PS | Particle Size |
| LX | KATHON ™ LX Preservative |
| Tego 825 | Tego 825 defoamer |
| EDTA | Ethylenediaminetetraacetic acid |
| VeoVa 10 | Vinyl Ester of Versatic 10 |
| CF-10* | TRITON ™ CF-10 Surfactant |
| AMP-95 | 2-Amino-2-methyl-l-propanol |
| NXZ | Foamaster NXZ Defoamer |
| Texanol | Texanol Coalescent |
| 9165* | ROVACE ™ 9165 Emulsion Polymer |
| TiO2 | Ti-Pure R-902+ |
| 1288* | ORATAN ™ 1288 Waterborn Pigment Dispersant |
| 250 HBR | Natrosol 250 HBR HEC |
| AMP-95* | AMP-95 ™ Primary Amino Alcohol |
| CC-700 | Extender |

*ROVACE, TRITON, ORATAN, KATHON and AMP-95 are Trademarks of The Dow Chemical Company or its Affiliates.

Example 1

A monomer emulsion was prepared by first mixing charging a flask with DI water (357.0 g), FES-32 (37.3 g), FES-993 (55.0 g), SVS (33.0 g), VA (1285.2 g), BA (165.7 g), VeoVa10 (165.7 g), PEM (34.0 g). FES-32 (16.0 g) and DI water (34.0 g) were separately charged into a 5-L 4-necked round bottom reactor equipped with a mechanical stirrer, thermometer, condenser, heating mantel, and temperature controller. The contents of the reactor were heated to 78° C. under N$_2$ with stirring, whereupon a portion of the monomer emulsion (63.4 g) was added, followed by SPS (3.34 g) in DI water (35 g) and a mixture FeSO$_4$.7H$_2$O (10.0 g, 0.2 aqueous weight %) and EDTA (2.1 g, 1% aqueous weight %) followed by a rinse of the vessels with DI water (8.0 g). The remaining monomer emulsion, a solution of SPS (2.52 g) and Na$_2$CO$_3$ (3.30 g) dissolved in DI water (115.0 g) and a solution of IAA (4.18 g) dissolved in DI water (115 g) were then added to the reactor over 150 min, with the reactor temperature being maintained at 75° C. The emulsion feed line to the reactor was then rinsed with DI water (30.0 g) and the contents of the reactor were cooled to 65° C. SPS (0.84 g) in DI water (17.0 g), and IAA (0.70 g) in DI water (17.0 g) were added to the reactor over 15 min; after holding for an additional 10 min, the contents of the reactor were cooled to 55° C., after which a solution of SPS (0.70 g) and t-BHP (1.70 g) in DI water (30.0 g), and a solution of IAA (2.40 g) in DI water (30.0 g) were added to the reactor over 30 min. The temperature of the contents of the reactor was allowed to drop to below 50° C., whereupon the contents were neutralized to pH 4.36 with aqueous NaOH (280 g, 6.0 weight %). A solution of LX (10.86 g) in DI water (10.0 g) and Tego 825 (1.26 g) was then added to the quenched reactor, and gel filtered off to produce a latex having a solids content 43.4% and a particle size of 122 nm.

Example 2

The latex of Example 2 was prepared substantially as described in Example 1 except that the monomer mixture was prepared using VA (1036.4 g), VeoVa 10 (579.8 g), SVS (33.0 g), and PEM (34.0 g). The resulting aqueous latex was found to have a solids content of 44.0 wt. % and a particle size of 117 nm.

Example 3

A monomer emulsion was prepared by first mixing DI water (357.0 g), FES-32 (26.6 g), FES-993 (55.0 g) into a flask, followed by addition SVS (33.0 g), VA (1316.7 g), BA (165.7 g), VeoVa10 (165.7 g), and PEM (1.73 g). FES-32 (26.6 g) and DI water (800.0 g) were separately charged into a 5-L 4-necked round bottom reactor equipped with a mechanical stirrer, thermometer, condenser, heating mantel and temperature controller. The contents of the reactor were heated to 78° C. under N$_2$ with stirring, whereupon NaOAc (2.48 g) in DI water (16.0 g) was added, followed by addition of SPS (2.51 g) in DI water (19.8 g) and a mixture of FeSO$_4$.7H$_2$O (10.0 g, 0.2 aqueous weight %) and EDTA (2.1 g, 1% aqueous weight %) followed by a rinse with DI water (8.0 g). The monomer emulsion, a solution of SPS (2.52 g) and t-BHP (4.71 g) dissolved in DI water (280.0 g), and a solution of FF6 (4.18 g) and aq NH$_3$ (3.50 g) dissolved in DI water (280 g) were then added separately and concurrently to the reactor at a temperature of 75° C. over 200 min. The monomer emulsion feed line to the reactor was rinsed with DI water (33.0 g) and the contents of the reactor was then cooled to 65° C. SPS (0.84 g) in DI water (17.0 g) and IAA (0.70 g) in DI water (17.0 g) were then added to the flask over 15 min; after holding for an additional 10 min reactor temperature was cooled to 55° C., whereupon SPS (0.70 g) and t-BHP (1.70 g) in DI water (30.0 g), and IAA (2.40 g) in DI water (30.0 g) were added to the reactor over 30 min. The temperature of the contents of the reactor was allowed to drop to below 50° C., after which a solution of LX (10.86 g) in DI water (15.0 g) and Tego 825 (1.26 g) were added to the flask. The gel was filtered off to produce a latex having a solids content of 44.6% and a particle size of 100 nm.

Example 4

The latex of Example 4 was prepared substantially as described in Example 3 except that the monomer mixture was prepared using VA (1229.3 g), VeoVa 10 (165.7 g), SVS (33.0 g), PEM (85.0 g), and BA (165.7 g). The resulting aqueous latex was found to have a solids content of 45.0 wt. % solid and a particle size of 139 nm.

Example 5

The latex of Example 5 was prepared substantially as described in Example 3 except that the monomer mixture was prepared using VA (497.5 g), VeoVa 10 (993.9 g), SVS (33.0 g), PEM (34.0 g), BA (124.4 g). The resulting aqueous latex was found to have a solids content of 44.8 wt. % solid and a particle size of 116 nm.

Comparative Example 1

The latex of Comparative Example 1 was prepared substantially as described in Example 3 except that the monomer mixture was prepared using VA (1318.3 g), VeoVa 10 (165.7 g), SVS (33.0 g), and BA (165.7 g). The resulting aqueous latex was found to have a solids content of 44.9 wt. % solid and a particle size of 108 nm.

Table 1 summarizes the compositions of the prepared latexes.

TABLE 1

VA/BA/Veova10/PEM Latex Compositions

| | Composition | | | | | Latex | |
|---|---|---|---|---|---|---|---|
| Latex | BA | VA | Veova10 | PEM[a] | SVS | pH | Neutralizer |
| Ex. 1 | 10.0% | 77.5% | 10.0% | 2.0% | 0.5% | 4.36 | NaOH |
| Ex. 2 | 0% | 65.0% | 35.0% | 2.0% | 0.5% | 4.99 | NaOH |
| Ex. 3 | 10.0% | 79.4% | 10.0% | 0.1% | 0.5% | 5.17 | $NH_3$ |
| Ex. 4 | 10.0% | 74.5% | 10.0% | 5.0% | 0.5% | 5.08 | $NH_3$ |
| Ex. 5 | 7.5% | 30.0% | 60.0% | 2.0% | 0.5% | 5.05 | $NH_3$ |
| Comp. Ex. 1 | 10.0% | 79.5% | 10.0% | 0% | 0.5% | 5.00 | $NH_3$ |

[a]% PEM is uncorrected for active amount, which is ~60% of the reported percentage Procedure for Preparing Paint Samples A control paint formulation was prepared as shown in Table 2. The grind was prepared with stirring in a 1.5 L plastic container, and letdown ingredients were added stepwise. The contents were stirred for 30 min obtain the final control paint.

TABLE 2

Control Paint Formulation

| Materials | Kg |
|---|---|
| Grind | |
| Water | 218.08 |
| 250 HBR | 4.00 |
| AMP-95 | 0.43 |
| 1288 | 3.98 |
| NXZ | 0.34 |
| $TiO_2$ | 151.34 |
| CC-700 | 203.07 |
| Letdown | |
| 9165 | 251.60 |
| CF-10 | 1.35 |
| NXZ | 0.68 |
| Texanol | 13.08 |
| Water | 152.03 |
| Total Amount | 1000 |
| Total PVC | 44.71% |
| Volume Solid | 33.90% |

The paint formulations of the examples are summarized in Table 3. The Premix, Grind and Letdown were prepared separately; the Grind was transferred to a 1.5-L plastic container with a 3-blade pitched metal stirrer, and the Remix and Letdown were added slowly with stirring for 30 min obtain the final paint.

TABLE 3

Example Paint Formulations

| Materials | Kg |
|---|---|
| Premix | |
| Water | 64.27 |
| 1288 | 1.11 |
| NXZ | 0.55 |
| $TiO_2$ | 128.64 |
| Prepared Latex | 116.36 |
| Water | 65.06 |
| Grind | |
| Water | 200.00 |
| 250 HBR | 4.00 |
| AMP-95 | 0.80 |
| 1288 | 2.80 |
| NXZ | 0.34 |
| CC-700 | 218.40 |
| Letdown | |
| 9165 | 135.24 |
| CF-10 | 1.35 |
| NXZ | 0.68 |
| Texanol | 13.08 |
| Water | 47.31 |
| Total Amount | 1000 |
| Total PVC | 44.71% |
| Volume Solids | 34.10% |

Measurement of Hiding

The paint prepared above equilibration for at least 1 day, scattering measurements were made by casting the coatings onto a black release chart (Leneta RC-BC black release chart) using a 1.5-mil Bird applicator (6-inch wide). Additionally a thick paint film was cast using a 25-mil applicator (3-inch wide block type) onto a black release chart. The coatings were dried for at least 1 day and the Y reflectance of each dried coating was determined in replicate using a spectrophotometer (X-Rite corporation, Model Color I7). After measuring the reflectance, a 13-in$^2$ section was removed from the coating and weighed using an aluminum weighing pan on an analytical balance. The scattering per unit thickness (S/mil) was determined using the following calculation:

$$S = \frac{R}{X \times (1 - R^2)} \times \ln\frac{1 - (R_B \times R)}{1 - \frac{R_B}{R}}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A).

$$X(\text{mils}) = \frac{W_{pf}(g) \times 1000(\text{mil/in})}{D(\text{lbs/gal}) \times 1.964(g/in^3/\text{lbs/gal}) \times A(\text{in})}$$

Tables 4 show S/mil comparisons for paint formulations with and without PEM-containing binder.

TABLE 4

Hiding Comparison of the Paints Base on the Latex Examples

| Material Latex | Control 9165 | Paint 1 Ex. 1 | Paint 2 Ex. 2 | Paint 3 Ex. 3 | Paint 4 Ex. 4 | Paint 5 Ex. 5 | Paint Comp 1 Comp. Ex. 1 |
|---|---|---|---|---|---|---|---|
| $TiO_2$ | — | −15% | −15% | −15% | −15% | −15% | −15% |
| pH | 8.6 | 8.1 | 8.2 | 8.2 | 8.1 | 8.4 | 8.8 |
| S/mil | 4.55 | 4.44 | 4.25 | 4.21 | 4.17 | 4.11 | 3.53 |

The amount of TiO$_2$ used in each of the experimental paints was 15% less than the amount used for the control paint, which contained ROVACE™ 9165 Binder and no PEM. The data show that the hiding (S/mil) observed for Paint 1 was similar to that observed for the non-PEM containing control; moreover, the comparative example, which also did not include PEM, shows a substantial drop in S/mil with respect to any of the PEM-containing paints.

The invention claimed is:

1. A composition comprising a stable aqueous dispersion of polymer particles comprising, based on the weight of the polymer particles, from 63.9 to 90 weight percent structural units of vinyl acetate, from 0.1 to 5 weight percent structural units of a phosphoethyl methacrylate or a salt thereof, and from 5 to 34.4 weight percent structural units of a vinyl ester of a branched carboxylic acid monomer characterized by the following formula:

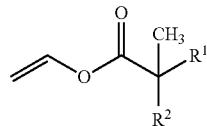

where $R^1$ and $R^2$ are each independently $C_1$-$C_{10}$-alkyl.

2. The composition of claim 1 wherein the polymer particles further comprise from 0.1 to 2.0 weight percent structural units of a sulfur acid monomer or a salt thereof, based on the weight of the polymer particles; and/or from 0.1 to 50 weight percent structural units of an acrylate monomer, based on the weight of the polymer particles.

3. The composition of claim 1 wherein the polymer particles further comprise from 0.1 to 2 weight percent structural units of 2 acrylamido-2-methyl propanesulfonic acid or vinyl sulfonic acid or salts thereof and from 1 to 30 weight percent structural units of butyl acrylate, based on the weight of the polymer particles.

4. The composition of claim 1 which further comprises TiO$_2$ particles, wherein at least some of the polymer particles adsorb onto the surface of the TiO$_2$ particles.

5. The composition of claim 4 which further includes one or more components selected from the group consisting of consisting of a rheology modifier, a defoamer, a surfactant, a dispersant, an extender, a solvent, a preservative, and a coalescent.

* * * * *